United States Patent [19]
Eberle

[11] 4,135,591
[45] Jan. 23, 1979

[54] SNOWMOBILE ROLLOVER PROTECTIVE STRUCTURE

[76] Inventor: Keith F. Eberle, R.R. #2, Box 59, Pocahontas, Iowa 50574

[21] Appl. No.: 842,982

[22] Filed: Oct. 17, 1977

[51] Int. Cl.² ........................................... B60R 27/00
[52] U.S. Cl. .................................... 180/5 R; 280/756
[58] Field of Search ...................... 280/756, 762, 770; 296/102; 180/5 R, 6 A, 104

[56] References Cited
U.S. PATENT DOCUMENTS

| | | | |
|---|---|---|---|
| 3,622,175 | 11/1971 | Benz et al. | 180/5 R X |
| 3,704,031 | 11/1972 | Confer | 280/756 |
| 3,736,005 | 5/1973 | Wright | 280/756 |
| 3,743,316 | 7/1973 | Stotesbery | 280/762 |

Primary Examiner—Robert R. Song
Assistant Examiner—Norman L. Stack, Jr.
Attorney, Agent, or Firm—Howard I. Podell

[57] ABSTRACT

An attachment for protecting the hood and controls of snowmobiles from damage caused by the turning over of the vehicle which comprises a rigid, welded, cage structure extending above the steering handlebar but below the windshield. The structure is removably secured by its lower end to horizontal mounting brackets fixed on each side of the vehicle.

2 Claims, 5 Drawing Figures

SNOWMOBILE ROLLOVER PROTECTIVE STRUCTURE

FIELD OF THE INVENTION

This invention relates to a protective attachment for a snowmobile or the like designed with a view to provide maximum protection to the hood of the vehicle and to the handlebars in case the vehicle overturns.

The attachment is inexpensive to build and can readily be mounted on any snowmobile. Its concept takes into account several consequences of a snowmobile's overturning. One, the cost of repairing a hood can be very high. Replacing a windshield is not expensive. More importantly when a snowmobile overturns, the handlebar and the throttle controls thereon will hit the ground. Frequently, a chunk of ice will become lodged under the controls turning the engine wide open. If the snowmobile makes a complete rollover, it will end right side up, throttle wide open ready to literally attack anyone in its path such as the driver who probably was thrown off or any bystanders. If it does not hit anyone, it still may hurtle against an obstacle causing extensive damages to itself or to property.

With the above considerations uppermost, it is seen that an inexpensive protective shield need only protect the hood and the handle bars of the vehicle. None of the following listed patents are based on this concept.

STATEMENT OF PRIOR ART

The prior art, as exemplified by U.S. Pat. Nos. 2,783,056; 3,662,177; 3,658,358; 2,529,998 and 3,704,031 is generally illustrative of various devices of this type. While such devices are generally acceptable for their intended purpose, they have not proven to be entirely satisfactory in that they are either complex and expensive to manufacture, or bulky and inconvenient to use.

As a result of the shortcomings of the prior art, typified by the above, there has developed and continues to exist a substantial need for devices of the character described. Despite this need, and the efforts of many individuals and companies to develop such devices, a satisfactory device meeting this need has heretofore been unavailable.

The principal object of this invention is to provide a device or article of this character which combines simplicity, strength and durability in a high degree, together with inexpensiveness of construction.

Other objects of this invention will in part be obvious and in part hereinafter pointed out.

SUMMARY OF THE INVENTION

This invention resides in an attachment for protecting the hood and controls of snowmobiles from damage caused by the turning over of the vehicle which comprises a rigid, welded, cage structure extending above the steering handlebar but below the windshield. The structure is removably secured by its lower end to horizontal mounting brackets fixed on each side of the vehicle.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENT

Figure 1:
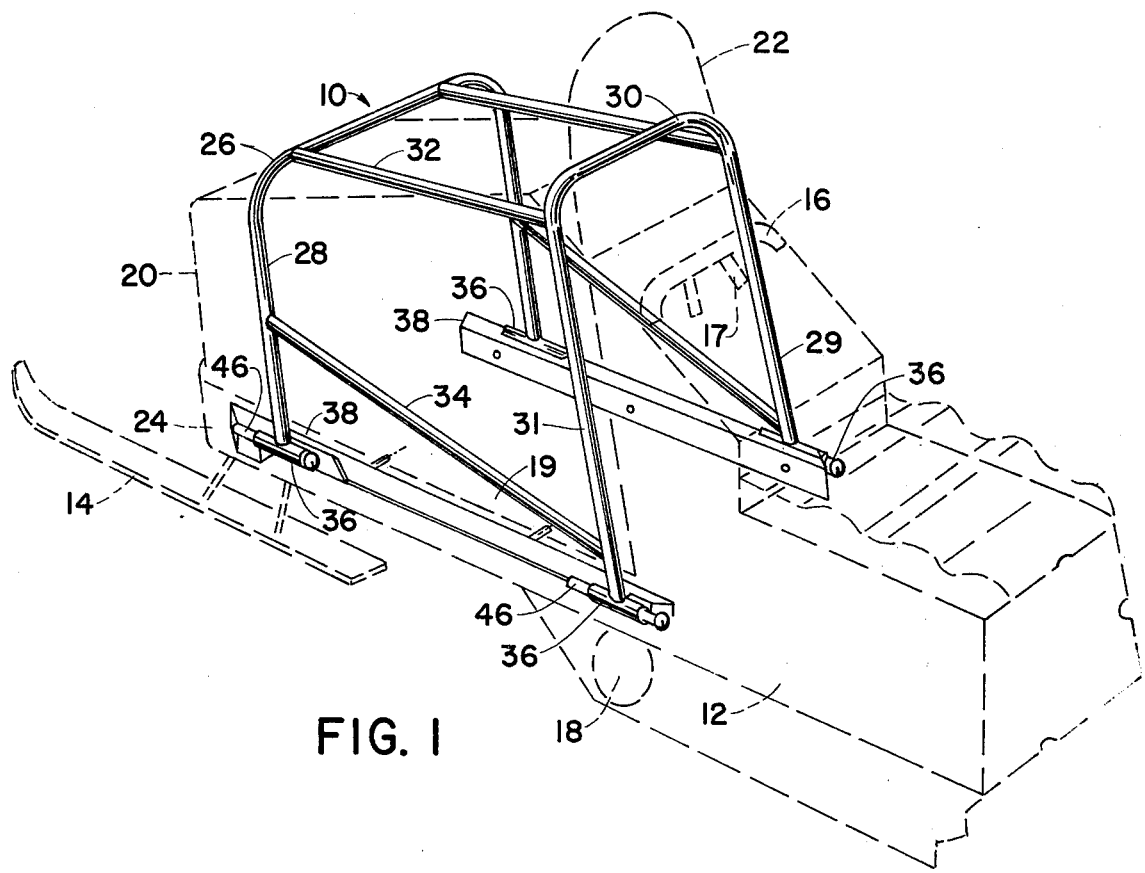
FIG. 1 is a view in perspective showing a snowmobile equipped with the protective device of this invention.
Figure 3:
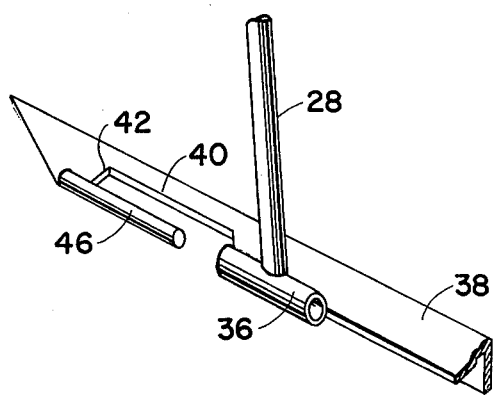
FIG. 3 is a perspective view thereof.

With reference to the drawing, there is shown and illustrated a ROLL BAR ATTACHMENT FOR A SNOWMOBILE constructed in accordance with the principles of the invention and designated generally by reference character 10.

The attachment 10 is shown mounted on a snowmobile 12 which has steering skis 14 angularly movable under the front thereof by handlebars 16 with controls 17 thereon and a propelling track 18 driven by an engine mounted on the vehicle frame 19 near the front. The engine is housed under a hood 20 on whose upper edge is mounted a transparent plastic windshield 22. A bumper 24 extends around the front of the snowmobile to the back beginning at about the level of the lower edge of hood 20 being secured thereto by any convenient means.

The protective attachment of the invention includes a first tubular arched metal member 26 having upwardly extending legs 28 each disposed on opposite sides of hood 20 and connected by a cross-portion extending substantially transversely to the direction of motion of the vehicle between the uppermost ends of the legs. Spaced rearwardly of member 26 is a similar but taller member 29 which has a cross portion 30 extending above the handlebar 16 but considerably below the upper edge of windshield 22. From each of the cross portions extend tubular members 32 which are welded thereto. Angled brace bars 34 connect the vertical legs on each side of members 29 and 26 being welded thereto for greater rigidity.

Figure 4:
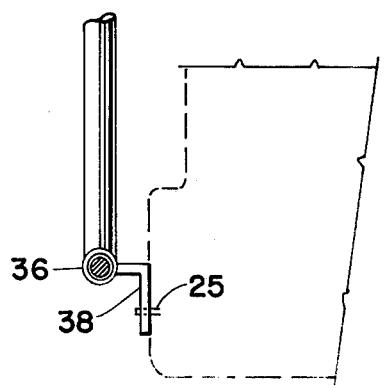
FIG. 4 is a partial end view showing attachment of the device to the bracket and FIG. 5 is a detailed view showing locking means for securing the device to the brackets.
Figure 2:
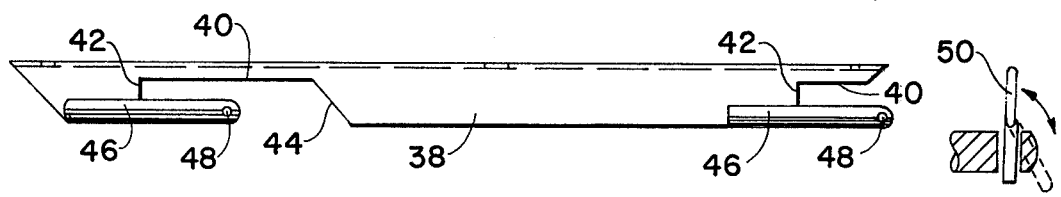
FIG. 2 is a top plan view of a mounting bracket for attaching the device.

Welded at the lower end of each leg is a horizontal metal tube 36 for securing the attachment to the snowmobile. Bolted by bolts 25 to bumper 24 or to the frame 19 on each side are a pair of angle irons 38 having an inverted "L" shape and preferably ¾ inch thick. The horizontal part of the angle irons have notches 40 therein with a straight front part 42 and a biased opening 44. A round rod 46 is welded above part 42 and extends along the notch short of opening 44 so as to receive tubular member 36 as shown in FIG. 4.

Figure 5:

As shown in FIG. 5, an opening 48 is made at the end of each rod 46 through which is passed a flop over pin 50 for removably securing the device 10 to snowmobile 12.

A vehicle equipped with the device of this invention was overturned 172 times with the hood remaining perfectly intact.

All metal members are preferably chromium plated for purposes of appearance and protection from corrosion.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size, and arrangement of the elements of this invention as claimed may be resorted to in actual practice, if desired.

Having thus described the invention, what is claimed as new and to be secured by Letters Patent is:

1. In a snowmobile having a frame, an engine mounted on the forward end of said frame; a hood over said engine; a windshield extending above said hood; front steering skies, a handlebar for angularly moving said skies; controls on said handlebar; a protective cage-like structure comprising a rigid frame including first and second spaced vertical members adapted to be mounted and secured removably to said frame on opposed sides adjacent the front end thereof; said first member straddling said hood; said second member extending above said handlebar but below the upper end of said windshield; rigid lateral supports extending between said first and second members and welded thereto; mounting means fixed horizontally to the lower part of said snowmobile on each side thereof; and securing means at the lower end of said first and second members for securing same removably to said mounting means, wherein said mounting means consist of inverted "L" shaped members having spaced notches in the upper part thereof, tubular rods welded above said notches; said securing means consisting of tubular sleeves welded to the ends of said first and second members, said sleeves fitting on said rods.

2. The invention as recited in claim 1, wherein said rods have vertical axial openings and locking pins fitting therein for preventing said sleeves from slipping therefrom.

* * * * *